(12) United States Patent
Turgut et al.

(10) Patent No.: US 12,069,469 B2
(45) Date of Patent: Aug. 20, 2024

(54) HEAD DIMENSION ESTIMATION FOR SPATIAL AUDIO APPLICATIONS

(71) Applicant: Apple Inc., Cupertino, CA (US)

(72) Inventors: Ozhan Turgut, Menlo Park, CA (US); Halil Ibrahim Basturk, San Jose, CA (US); Alexander Singh Alvarado, San Jose, CA (US); Adam S. Howell, Oakland, CA (US); Hung A. Pham, Oakland, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 17/351,183

(22) Filed: Jun. 17, 2021

(65) Prior Publication Data
US 2021/0400419 A1 Dec. 23, 2021

Related U.S. Application Data

(60) Provisional application No. 63/041,903, filed on Jun. 20, 2020.

(51) Int. Cl.
| | | |
|---|---|---|
| *H04S 7/00* | (2006.01) | |
| *G01P 15/18* | (2013.01) | |
| *G06F 3/01* | (2006.01) | |

(52) U.S. Cl.
CPC ............ *H04S 7/304* (2013.01); *G01P 15/18* (2013.01); *G06F 3/012* (2013.01)

(58) Field of Classification Search
CPC .......... H04S 7/304; G01P 15/18; G06F 3/012; G01B 21/10; H04R 5/04; H04R 5/033
See application file for complete search history.

(56) References Cited

U.S. PATENT DOCUMENTS

| | | |
|---|---|---|
| 9,142,062 B2 | 9/2015 | Maciocci et al. |
| 9,459,692 B1 | 10/2016 | Li |
| 10,339,078 B2 | 7/2019 | Nair et al. |
| 11,582,573 B2 | 2/2023 | Tu et al. |
| 11,586,280 B2 | 2/2023 | Kriminger et al. |
| 11,589,183 B2 | 2/2023 | Tu et al. |
| 11,647,352 B2 | 5/2023 | Tam et al. |

(Continued)

OTHER PUBLICATIONS

Jolliffe et al., "Principal component analysis: a review and recent developments," Philosophical transactions of the royal society A: Mathematical, Physical and Engineering Sciences, Apr. 13, 2016, 374(2065):20150202, 16 pages.

(Continued)

*Primary Examiner* — Yosef K Laekemariam
(74) *Attorney, Agent, or Firm* — Fish & Richardson P.C.

(57) ABSTRACT

Embodiments are disclosed for head dimension estimation for spatial audio applications. In an embodiment, a method comprises: obtaining, using one or more processors of an audio headset worn on a user's head, acceleration samples and rotation rate samples over a specified time window while the user rotates their head, the acceleration samples and rotation rate samples measured using motion sensors in the headset; determining a function that relates the acceleration samples to the rotation rate samples; comparing the function to a plurality of reference functions, where each reference function corresponds to a different head dimension in a nominal range of head dimensions; and estimating a dimension of the user's head based on the comparing.

26 Claims, 5 Drawing Sheets

(56) References Cited

U.S. PATENT DOCUMENTS

| | | |
|---|---|---|
| 11,675,423 B2 | 6/2023 | Akgul et al. |
| 2005/0281410 A1 | 12/2005 | Grosvenor et al. |
| 2014/0153751 A1 | 6/2014 | Wells |
| 2015/0081061 A1 | 3/2015 | Aibara et al. |
| 2015/0302720 A1 | 10/2015 | Zhang et al. |
| 2016/0119731 A1 | 4/2016 | Lester, III |
| 2016/0262608 A1 | 9/2016 | Krueger |
| 2016/0269849 A1 | 9/2016 | Riggs et al. |
| 2017/0188895 A1 | 7/2017 | Nathan |
| 2017/0295446 A1* | 10/2017 | Thagadur Shivappa . G06F 3/16 |
| 2018/0091923 A1* | 3/2018 | Satongar .................. H04R 5/04 |
| 2018/0125423 A1 | 5/2018 | Chang et al. |
| 2018/0176468 A1 | 6/2018 | Wang et al. |
| 2018/0220253 A1 | 8/2018 | Kärkkäinen et al. |
| 2018/0242094 A1* | 8/2018 | Baek ....................... H04R 5/04 |
| 2019/0166435 A1 | 3/2019 | Crow et al. |
| 2019/0121522 A1 | 4/2019 | Davis et al. |
| 2019/0224528 A1 | 7/2019 | Omid-Zohoor et al. |
| 2019/0313201 A1 | 10/2019 | Torres et al. |
| 2019/0379995 A1 | 12/2019 | Lee et al. |
| 2020/0037097 A1 | 1/2020 | Torres et al. |
| 2020/0059749 A1 | 2/2020 | Casimiro Ericsson et al. |
| 2020/0169828 A1 | 5/2020 | Liu et al. |
| 2021/0044913 A1 | 2/2021 | Haussler et al. |
| 2021/0211825 A1 | 7/2021 | Joyner et al. |
| 2021/0396779 A1 | 12/2021 | Sarathy et al. |
| 2021/0397249 A1 | 12/2021 | Kriminger et al. |
| 2021/0397250 A1 | 12/2021 | Akgul et al. |
| 2021/0400414 A1 | 12/2021 | Tu et al. |
| 2021/0400418 A1 | 12/2021 | Tam et al. |
| 2021/0400420 A1 | 12/2021 | Tam et al. |
| 2022/0103964 A1 | 3/2022 | Tu et al. |
| 2022/0103965 A1 | 3/2022 | Tu et al. |

OTHER PUBLICATIONS

Zhang et al., "Template Matching Based Motion Classification for Unsupervised Post-Stroke Rehabilitation," Paper, Presented at Proceedings of the International Symposium on Bioelectronics and Bioinformations 2011, Suzhou, China, Nov. 3-5, 2011, pp. 199-202.

* cited by examiner

HEAD DIMENSION ESTIMATION FOR SPATIAL AUDIO APPLICATIONS

CROSS-REFERENCE TO RELATED APPLICATION

This application claims priority to U.S. Provisional Patent Application No. 63/041,903, filed Jun. 20, 2020, the entire contents of which are incorporated herein by reference.

TECHNICAL FIELD

This disclosure relates generally to spatial audio applications.

BACKGROUND

Spatial audio creates a three-dimensional (3D) virtual auditory space that allows a user wearing a headset to pinpoint where a sound source is located in the 3D virtual auditory space while watching a movie, playing a video game or interacting with augmented reality (AR) content. Existing spatial audio platforms include a head tracker that uses a video camera to track the head pose of a user. The head pose can be used to binaurally render spatial audio using a head-related transfer function (HRTF) for playback on headphones. Some spatial audio platforms ask the user to measure the circumference and inter-aural arc of their head using a tape measure and then enter the measurements into the platform using a graphical user interface (GUI). The measurements are then used to improve the spatial audio rendering.

SUMMARY

Embodiments are disclosed for head dimension estimation for spatial audio applications.

In an embodiment, a method comprises: obtaining, using one or more processors of an audio headset worn on a user's head, acceleration samples and rotation rate samples over a specified time window while the user rotates their head, the acceleration samples and rotation rate samples measured using motion sensors in the headset; determining a function that relates the acceleration samples to the rotation rate samples; comparing the function to a plurality of reference functions, where each reference function corresponds to a different head dimension in a nominal range of head dimensions; and estimating a dimension of the user's head based on the comparing.

In an embodiment, the head dimension is a radius from audio headset to a geometric center of the user's head.

In an embodiment, the function is determined using linear regression analysis.

In an embodiment, the method further comprises: prior to determining the function, removing a gravitational component and tangential acceleration component from the acceleration samples to obtain a linear relationship between the acceleration samples and rotation rate samples squared.

In an embodiment, the tangential acceleration component is removed using principal component analysis.

In an embodiment, the method further comprises rendering spatial audio using the estimated head dimension.

In an embodiment, the estimated head dimension is used to select or modify a head-related transfer function (HRTF) of a binaural rendering engine.

In an embodiment, the estimated head dimension is used to calculate a spatial auditory cue used in rendering the spatial audio.

In an embodiment, a method comprises: obtaining, using one or more processors of an audio headset worn on a user's head, acceleration samples and rotation rate samples over a specified time window while the user rotates their head, the acceleration samples and rotation rate samples measured using motion sensors in the headset; estimating angular acceleration samples from the rotation rate samples; removing a gravitational component from the acceleration samples; determining a function that relates the acceleration samples, the rotation rate samples and the estimated angular acceleration samples; comparing the function to a plurality of reference functions, where each reference function corresponds to a different head dimension in a nominal range of head dimensions; and estimating a dimension of the user's head based on the comparing.

In an embodiment, the head dimension is a radius from audio headset to a geometric center of the user's head.

In an embodiment, the method further comprises rendering spatial audio using the estimated head dimension.

In an embodiment, the estimated head dimension is used to select or modify a head-related transfer function (HRTF) of a binaural rendering engine.

In an embodiment, the estimated head dimension is used to calculate a spatial auditory cue used in rendering the spatial audio.

In an embodiment, a system comprises: one or more processors; memory storing instructions that when executed by the one or more processors of an audio headset worn on a user's head, cause the one or more processors to perform operations comprising: obtaining acceleration samples and rotation rate samples over a specified time window while the user rotates their head, the acceleration samples and rotation rate samples measured using motion sensors in the headset; determining a function that relates the acceleration samples to the rotation rate samples; comparing the function to a plurality of reference functions, where each reference function corresponds to a different head dimension in a nominal range of head dimensions; and estimating a dimension of the user's head based on the comparing.

Other embodiments can include an apparatus, computing device and non-transitory, computer-readable storage medium.

Particular embodiments disclosed herein provide one or more of the following advantages. Spatial audio rendering is improved by automatically estimating a user's head dimensions using acceleration and rotation rate samples output by a headset IMU undergoing rotational motion. An advantage of the disclosed head estimation is that the user is not required to measure their head dimensions with a measuring tape and then manually enter the measurements into the spatial audio platform.

The details of one or more implementations of the subject matter are set forth in the accompanying drawings and the description below. Other features, aspects and advantages of the subject matter will become apparent from the description, the drawings and the claims.

DETAILED DESCRIPTION

Example Systems

Figure 1:
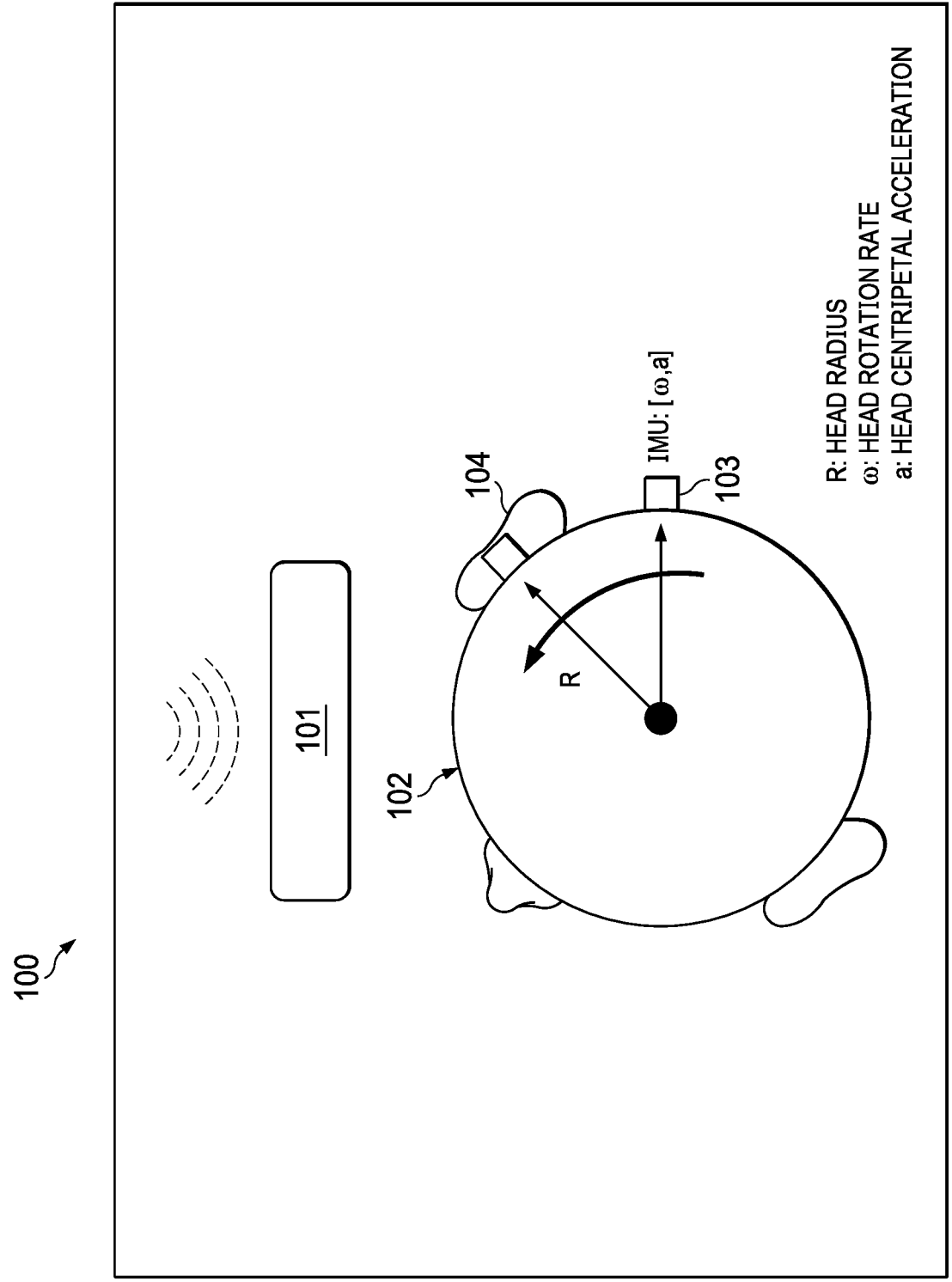
FIG. 1 illustrates a headset IMU undergoing rotational motion, according to an embodiment.

FIG. 1 illustrates a headset inertial measurement unit (IMU) 103 undergoing rotational motion, according to an embodiment. Headset IMU 103 is mounted in headset 104 which is worn in or over the ears of user 102. In this scenario, user 102 is watching AV content played on source device 101 while listing to spatial audio portion of the AV content on headset 104. Headset 104 is any device that includes loudspeakers for projecting binaurally rendered spatial audio, including but not limited to: headsets, earbuds, ear phones and loudspeakers (e.g., smart speakers). In an embodiment, headset 104 includes the architecture 400 described in reference to FIG. 4. The architecture includes IMU 411 which includes various motion sensors, including but not limited to an angular rate sensor (e.g., 3-axis MEMS gyro) and an accelerometer (e.g., 3-axis MEMS accelerometer). When the head of user 102 translates or rotates, the motion sensors in IMU 511 detect and measure the motion.

In an embodiment, the audio portion of the AV content is binaurally rendered by a spatial audio rendering engine on source device 101 and/or headset 104. Source device 101 can be any device capable of rendering spatial audio content and communicating with headset 104, including but not limited to a tablet computer, notebook computer, smartphone, smart glasses, augmented reality (AR) headset, wearable computer, etc. The rendered spatial audio is transferred to headset 104 over a wired or wireless communication link between source device 101 and headset 104 (e.g., Bluetooth).

When user 102 rotates their head to the left as shown while in a seated position, the 3-axis MEMS accelerator and the 3-axis MEMS gyro detect the motion and capture acceleration and rotation rate samples, respectively, in the headset IMU reference frame. The measurements are stored in a buffer on source device 101 and/or headset 104. When headset IMU 103 undergoes rotational motion, a centripetal acceleration and rotation rate are measured by the accelerometer and gyro, respectively, where the centripetal acceleration is given by Equation [1]:

$$\bar{a}_c = \frac{\bar{V}^2}{R}, \quad [1]$$

where $\bar{V}$ is velocity and R is the radius from headset IMU 103 to the center of rotation which is the geometric center of the user's head. Additionally, centripetal acceleration is related to rotation rate ω through Equation [2]:

$$\bar{a}_c = \omega^2 R. \quad [2]$$

As observed by Equations [1] and [2], and assuming R is constant, there is a linear relationship between centripetal acceleration and squared rotation rate. This linear relationship is exploited to estimate head dimension using statistical modeling, such as linear regression modeling, as described in reference to FIGS. 2A and 2B.

In an embodiment, the raw acceleration measurements from the accelerometer are processed to remove the gravitational component. Also, since the acceleration measurements captured during rotational only motion will include tangential acceleration as well, methods like principle component analysis (PCA) can be used on the acceleration measurements to separate centripetal acceleration. Alternatively, the acceleration with the gravitational component removed can be used and the relationship between total user acceleration, rotation rates and angular acceleration (e.g., estimated using rotation rates) can be leveraged.

Figure 2A:
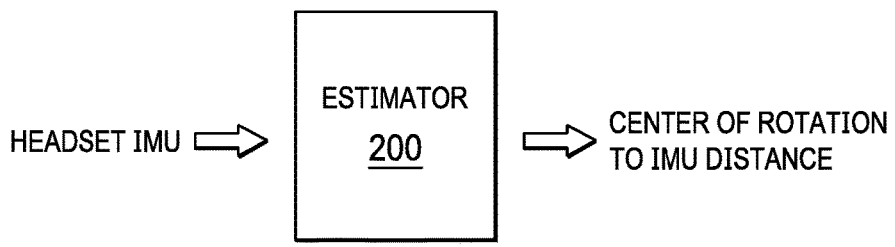
FIG. 2A is a block diagram of a system for estimating head dimension, according to an embodiment.

FIG. 2A is a block diagram of a system 200 for estimating head dimensions, according to an embodiment. System 200 takes samples of acceleration and rotation rates and performs a linear regression analysis on the samples, as shown in FIG. 2B.

Figure 2B:
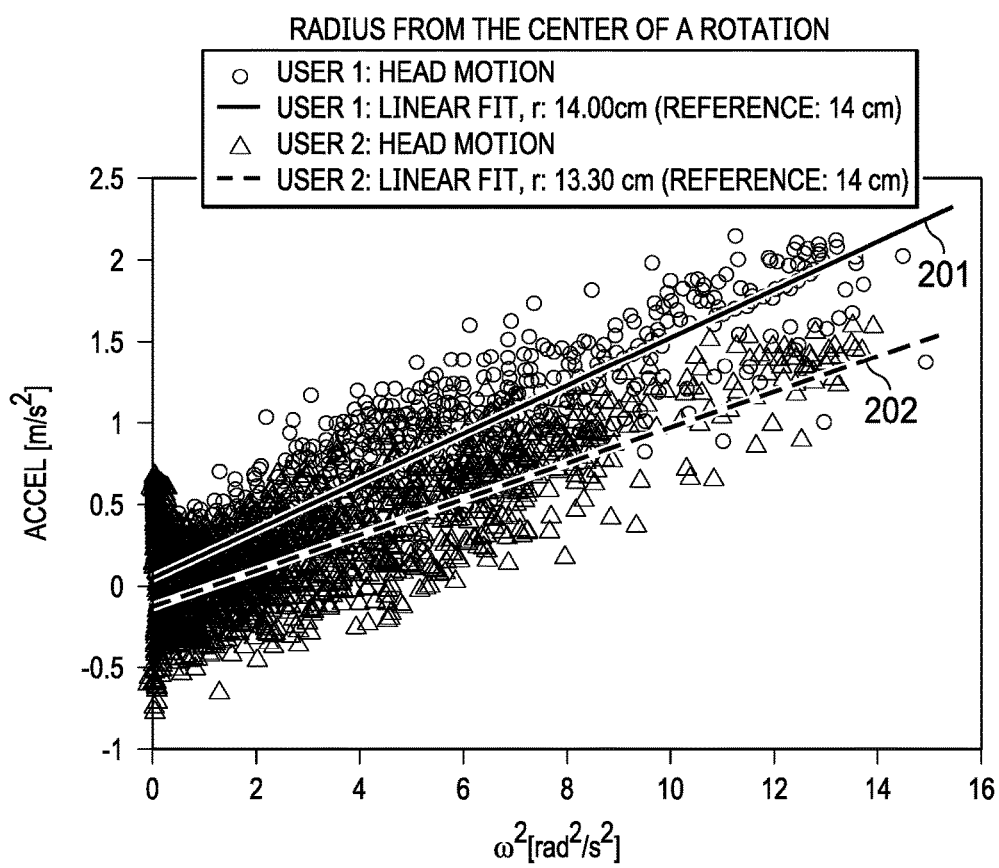
FIG. 2B is a scatter plot of acceleration versus squared rotation rate illustrating the use of linear regression analysis to estimate head dimension, according to an embodiment.

FIG. 2B is a scatter plot of acceleration versus squared rotation rate for two different sets of motion data. Line 201 is fitted to a first set of samples generated by headset IMU 103 and line 202 is fitted to a second set of samples generated by headset IMU 103. Coefficients (e.g., slopes and intercepts) for the linear fit functions can be generated offline (e.g., using the method of least squares) for different radii and stored in a database on source device 101 and/or headset 104.

During a spatial audio session, acceleration and rotation rate samples are generated when the user turns her head. These samples are fitted with the database of reference fit functions, each of which is associated with a different head radius. The reference fit functions are selected to span a nominal range of human head radii, such as 26.5-29.25 centimeters for women and 28-30.5 centimeters for men. The radius associated with the closest fit to the samples is the estimated head radius. The head circumference can be computed by multiplying the head radius by 2π.

Figure 3:
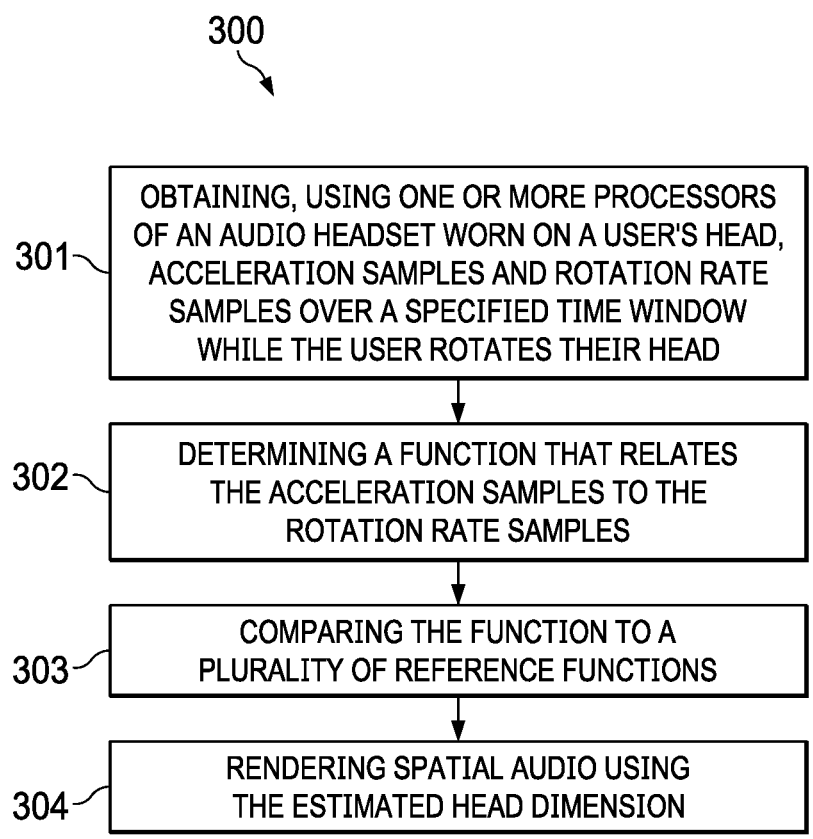
FIG. 3 is a flow diagram of a process of estimating head dimension, according to an embodiment.

FIG. 3 is a flow diagram of process 300 of head dimension estimation, according to an embodiment. Process 300 can be implemented using, for example, the source device architecture 400 and headset architecture 500, as described in reference to FIGS. 4 and 5, respectively.

Process 300 begins by obtaining, using one or more processors of an audio headset worn on a user's head, acceleration samples and rotation rate samples over a specified time window while the user rotates their head (301). The acceleration samples and rotation rate samples are measured using motion sensors (e.g., accelerometers, gyroscopes) in the headset.

Process 300 continues by determining a function that relates the acceleration samples to the rotation rate samples (302) and comparing the function to a plurality of reference functions (303). In an embodiment, a linear regression analysis is used to find the function and the plurality of reference functions for different head radii in a nominal range of head radii for men, women, children, etc. In an embodiment, the reference functions are stored in headset memory and used to compare or match with the determined function. In an embodiment, the determined function and plurality of reference functions are linear functions, and parameters characterizing the functions (e.g., the slopes and intercepts of the linear functions) are stored in headset memory for comparing.

Process 300 continues by rendering spatial audio using the estimated head dimension (304). For example, a binaural rendering engine can use the estimated head radius or circumference to select or modify a head-related transfer function (HRTF) or to calculate a more accurate spatial auditory cue, such as a more accurate interaural time delay (ITD).

Example Software/Hardware Architectures

Figure 4:
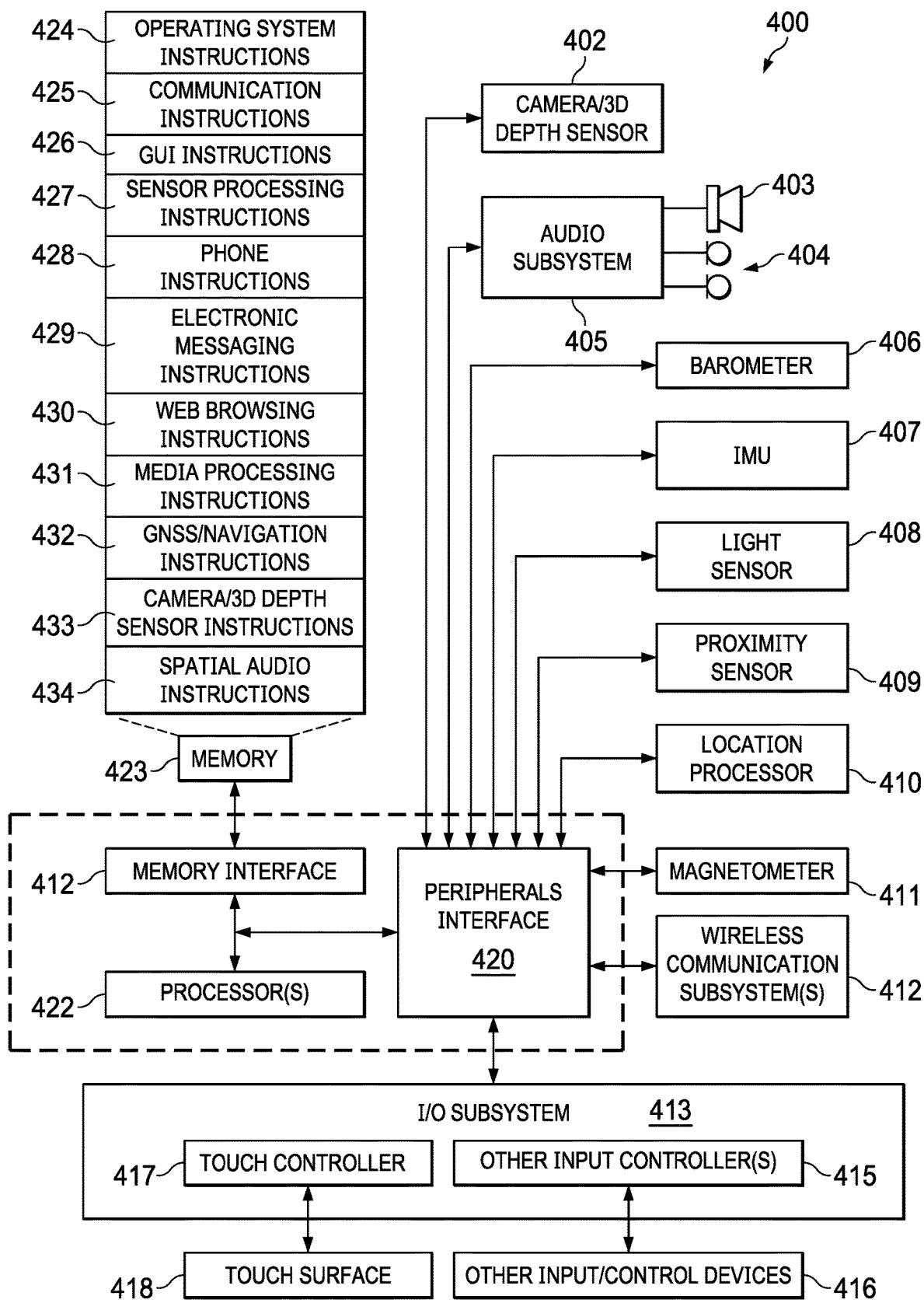
FIG. 4 a conceptual block diagram of a source device software/hardware architecture implementing the features and operations described in reference to FIGS. 1-3.

FIG. 4 is a conceptual block diagram of source device software/hardware architecture 400 implementing the features and operations described in reference to FIGS. 1-3. Architecture 400 can include memory interface 402, one or more data processors, digital signal processors (DSPs), image processors and/or central processing units (CPUs) 404 and peripherals interface 406. Memory interface 421, one or more processors 422 and/or peripherals interface 420 can be separate components or can be integrated in one or more integrated circuits.

Sensors, devices and subsystems can be coupled to peripherals interface 420 to provide multiple functionalities. For example, one or more motion sensors 407, light sensor 408 and proximity sensor 409 can be coupled to peripherals interface 420 to facilitate motion sensing (e.g., acceleration, rotation rates), lighting and proximity functions of the wearable computer. Location processor 410 can be connected to peripherals interface 420 to provide geo-positioning. In some implementations, location processor 410 can be a GNSS receiver, such as the Global Positioning System (GPS) receiver. Electronic magnetometer 411 (e.g., an integrated circuit chip) can also be connected to peripherals interface 420 to provide data that can be used to determine the direction of magnetic North. Electronic magnetometer 411 can provide data to an electronic compass application. Motion sensor(s) 407 can be an IMU that includes one or more accelerometers and/or gyros (e.g., 3-axis MEMS accelerometer and 3-axis MEMS gyro) configured to determine change of speed and direction of movement of the source device. Barometer 406 can be configured to measure atmospheric pressure around the mobile device.

Camera/3D depth sensor 402 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 412, which can include radio frequency (RF) receivers and transmitters (or transceivers) and/or optical (e.g., infrared) receivers and transmitters. The specific design and implementation of the wireless communication subsystem 412 can depend on the communication network(s) over which a mobile device is intended to operate. For example, architecture 400 can include communication subsystems 424 designed to operate over a GSM network, a GPRS network, an EDGE network, a Wi-Fi™ network and a Bluetooth™ network. In particular, the wireless communication subsystems 412 can include hosting protocols, such that the mobile device can be configured as a base station for other wireless devices.

Audio subsystem 405 can be coupled to a speaker 403 and one or more microphones 404 to facilitate voice-enabled functions, such as voice recognition, voice replication, digital recording and telephony functions. Audio subsystem 405 can be configured to receive voice commands from the user.

I/O subsystem 413 can include touch surface controller 417 and/or other input controller(s) 415. Touch surface controller 417 can be coupled to a touch surface 418. Touch surface 418 and touch surface controller 417 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 446. Touch surface 418 can include, for example, a touch screen or the digital crown of a smart watch. I/O subsystem 413 can include a haptic engine or device for providing haptic feedback (e.g., vibration) in response to commands from processor 422 or a digital signal processor (DSP). In an embodiment, touch surface 418 can be a pressure-sensitive surface.

Other input controller(s) 444 can be coupled to other input/control devices 448, such as one or more buttons, rocker switches, thumb-wheel, infrared port and USB port. The one or more buttons (not shown) can include an up/down button for volume control of speaker 403 and/or microphones 404. Touch surface 418 or other input control devices 416 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 418; and a pressing of the button for a second duration that is longer than the first duration may turn power to the mobile device on or off. The user may be able to customize a functionality of one or more of the buttons. The touch surface 418 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 421 can be coupled to memory 423. Memory 423 can include high-speed random access memory and/or non-volatile memory, such as one or more magnetic disk storage devices, one or more optical storage devices and/or flash memory (e.g., NAND, NOR). Memory 450 can store operating system 424, such as the iOS operating system developed by Apple Inc. of Cupertino, California Operating system 452 may include instructions for handling basic system services and for performing hardware dependent tasks. In some implementations, operating system 424 can include a kernel (e.g., UNIX kernel).

Memory 423 may also store communication instructions 425 to facilitate communicating with one or more additional devices, one or more computers and/or one or more servers, such as, for example, instructions for implementing a software stack for wired or wireless communications with other devices. Memory 423 may include graphical user interface instructions 426 to facilitate graphic user interface processing; sensor processing instructions 427 to facilitate sensor-related processing and functions; phone instructions 428 to facilitate phone-related processes and functions; electronic messaging instructions 429 to facilitate electronic-messaging related processes and functions; web browsing instructions 430 to facilitate web browsing-related processes and functions; media processing instructions 431 to facilitate media processing-related processes and functions; GNSS/Location instructions 432 to facilitate generic GNSS and location-related processes; and camera/3D depth sensor instructions 433 for capturing images (e.g., video, still images) and depth data (e.g., a point cloud). Memory 423 further includes head tracking instructions 434 for use in spatial audio applications, including but not limited AR and immersive video applications.

Each of the above identified instructions and applications can correspond to a set of instructions for performing one or more functions described above. These instructions need not be implemented as separate software programs, procedures, or modules. Memory 423 can include additional instructions or fewer instructions. Furthermore, various functions of the mobile device may be implemented in hardware and/or in software, including in one or more signal processing and/or application specific integrated circuits.

Figure 5:
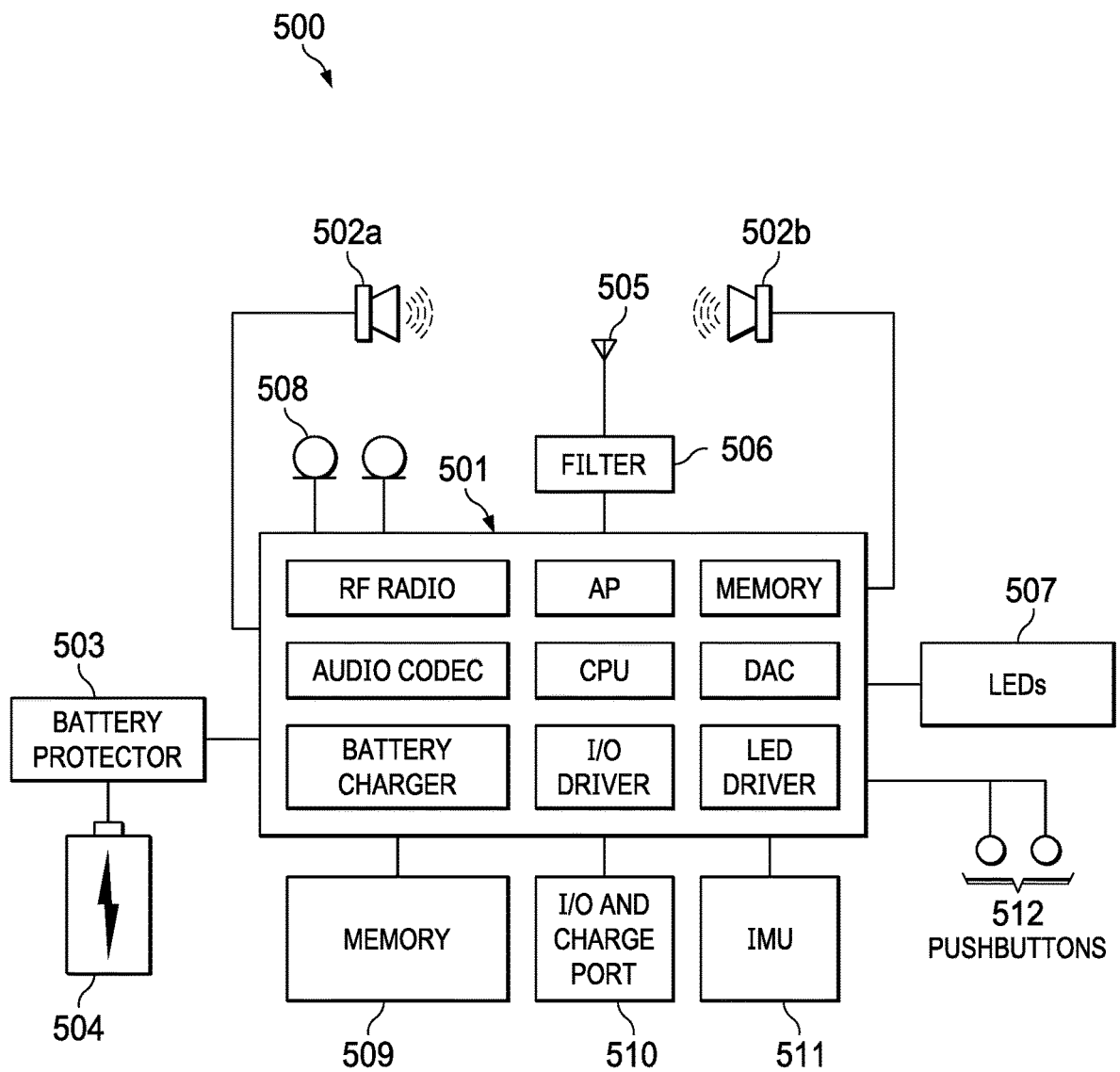
FIG. 5 a conceptual block diagram of a headset software/hardware architecture implementing the features and operations described in reference to FIGS. 1-3.

FIG. 5 is a conceptual block diagram of headset software/hardware architecture 500 implementing the features and operations described in reference to FIGS. 1-3. In an embodiment, architecture 500 can includes system-on-chip (SoC) 501, stereo loudspeakers 502a, 502b (e.g., ear buds, headphones, ear phones), battery protector 503, rechargeable battery 504, antenna 505, filter 506, LEDs 507, microphones 508, memory 509 (e.g., flash memory), I/O/Charge port 510, IMU 511 and pushbuttons 512 for turning the headset on and off, adjusting volume, muting, etc. IMU 511 was previously described in reference to FIGS. 1-5, and includes, for example, a 3-axis MEMS gyro and a 3-axis MEMS accelerometer.

SoC 501 further includes various modules, such as a radio frequency (RF) radio (wireless transceiver) for wireless bi-directional communication with other devices, such as a source device 101, as described in reference to FIGS. 1-3. SoC 501 further includes an application processor (AP) for running specific applications, memory (e.g., flash memory), central processing unit (CPU) for managing various functions of the headsets, audio codec for encoding/decoding audio, battery charger for charging/recharging rechargeable battery 504, I/O driver for driving I/O and charge port (e.g., a micro USB port), digital to analog converter (DAC) converting digital audio into analog audio and LED driver for driving LEDs 507. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
obtaining, using one or more processors of an audio headset worn on a user's head, acceleration samples and rotation rate samples over a specified time window while the user rotates their head, the acceleration samples and rotation rate samples measured using motion sensors in the headset;
determining a function that relates the acceleration samples to the rotation rate samples;
comparing the function to a plurality of reference functions, where each reference function corresponds to a different head dimension in a nominal range of head dimensions; and
estimating a dimension of the user's head based on the comparing.

2. The method of claim 1, wherein the head dimension is a radius from audio headset to a geometric center of the user's head.

3. The method of claim 1, wherein the function is determined using linear regression analysis.

4. The method of claim 1, further comprising:
prior to determining the function, removing a gravitational component and tangential acceleration component from the acceleration samples to obtain a linear relationship between the acceleration samples and rotation rate samples squared.

5. The method of claim 4, wherein the tangential acceleration component is removed using principal component analysis.

6. The method of claim 1, further comprising rendering spatial audio using the estimated head dimension.

7. The method of claim 6, wherein the estimated head dimension is used to select or modify a head-related transfer function (HRTF) of a binaural rendering engine.

8. The method of claim 6, wherein the estimated head dimension is used to calculate a spatial auditory cue used in rendering the spatial audio.

9. A method comprising:
obtaining, using one or more processors of an audio headset worn on a user's head, acceleration samples and rotation rate samples over a specified time window while the user rotates their head, the acceleration samples and rotation rate samples measured using motion sensors in the headset;
estimating angular acceleration samples from the rotation rate samples;
removing a gravitational component from the acceleration samples;
determining a function that relates the acceleration samples, the rotation rate samples and the estimated angular acceleration samples;
comparing the function to a plurality of reference functions, where each reference function corresponds to a different head dimension in a nominal range of head dimensions; and
estimating a dimension of the user's head based on the comparing.

10. The method of claim 9, wherein the head dimension is a radius from audio headset to a geometric center of the user's head.

11. The method of claim 9, further comprising rendering spatial audio using the estimated head dimension.

12. The method of claim 11, wherein the estimated head dimension is used to select or modify a head-related transfer function (HRTF) of a binaural rendering engine.

13. The method of claim 11, wherein the estimated head dimension is used to calculate a spatial auditory cue used in rendering the spatial audio.

14. A system comprising:
one or more processors;
memory storing instructions that when executed by the one or more processors of an audio headset worn on a user's head, cause the one or more processors to perform operations comprising:
obtaining acceleration samples and rotation rate samples over a specified time window while the user rotates their head, the acceleration samples and rotation rate samples measured using motion sensors in the headset;
determining a function that relates the acceleration samples to the rotation rate samples;
comparing the function to a plurality of reference functions, where each reference function corresponds to a different head dimension in a nominal range of head dimensions; and
estimating a dimension of the user's head based on the comparing.

15. The system of claim 14, wherein the head dimension is a radius from audio headset to a geometric center of the user's head.

16. The system of claim 14, wherein the function is determined using linear regression analysis.

17. The system of claim 14, further comprising:
prior to determining the function, removing a gravitational component and tangential acceleration component from the acceleration samples to obtain a linear relationship between the acceleration samples and rotation rate samples squared.

18. The system of claim 17, wherein the tangential acceleration component is removed using principal component analysis.

19. The system of claim 14, further comprising rendering spatial audio using the estimated head dimension.

20. The system of claim 19, wherein the estimated head dimension is used to select or modify a head-related transfer function (HRTF) of a binaural rendering engine.

21. The system of claim 19, wherein the estimated head dimension is used to calculate a spatial auditory cue used in rendering the spatial audio.

22. A system comprising:
one or more processors;
memory storing instructions that when executed by the one or more processors of an audio headset worn on a user's head, cause the one or more processors to perform operations comprising:
obtaining acceleration samples and rotation rate samples over a specified time window while the user rotates their head, the acceleration samples and rotation rate samples measured using motion sensors in the headset;
estimating angular acceleration samples from the rotation rate samples;
removing a gravitational component from the acceleration samples;
determining a function that relates the acceleration samples, the rotation rate samples and the estimated angular acceleration samples;

comparing the function to a plurality of reference functions, where each reference function corresponds to a different head dimension in a nominal range of head dimensions; and estimating a dimension of the user's head based on the comparing.

23. The system of claim 22, wherein the head dimension is a radius from audio headset to a geometric center of the user's head.

24. The system of claim 22, further comprising rendering spatial audio using the estimated head dimension.

25. The system of claim 22, wherein the estimated head dimension is used to select or modify a head-related transfer function (HRTF) of a binaural rendering engine.

26. The system of claim 24, wherein the estimated head dimension is used to calculate a spatial auditory cue used in rendering the spatial audio.

\* \* \* \* \*